United States Patent [19]

Turanskyj

[11] Patent Number: 4,969,803
[45] Date of Patent: Nov. 13, 1990

[54] COMPRESSOR UNIT

[75] Inventor: Lubomyr Turanskyj, Oberhausen, Fed. Rep. of Germany

[73] Assignee: MAN Gutehoffnungshutte GmbH, Oberhausen, Fed. Rep. of Germany

[21] Appl. No.: 239,550

[22] Filed: Sep. 1, 1988

[30] Foreign Application Priority Data

Sep. 3, 1987 [DE] Fed. Rep. of Germany ....... 3729486

[51] Int. Cl.$^5$ .............................................. F04B 39/06
[52] U.S. Cl. ..................... 417/247; 417/350; 417/423.3; 417/423.8; 415/177
[58] Field of Search ............... 417/243, 247, 350, 351, 417/423.3, 423.5, 423.8, 423.9, 423.12, 423.13, 423.14, 372, 369, 310; 415/177–179; 60/641.7; 165/41, 45

[56] References Cited

U.S. PATENT DOCUMENTS

| 1,071,042 | 5/1911 | Fuller | 417/423.5 X |
| 2,887,062 | 5/1959 | Cametti et al. | 417/370 X |
| 3,981,628 | 9/1976 | Carter | 417/247 |
| 4,105,372 | 8/1978 | Mishina et al. | 417/243 |
| 4,474,228 | 10/1984 | Rogalski et al. | 165/41 X |
| 4,523,896 | 6/1985 | Lhenry et al. | 417/350 X |
| 4,553,585 | 11/1985 | Pfleger et al. | 165/41 |
| 4,616,980 | 10/1986 | Carpenter | 417/369 X |
| 4,652,218 | 3/1987 | Tsutsui et al. | 417/370 X |
| 4,834,624 | 5/1989 | Jensen et al. | 417/423.8 X |

FOREIGN PATENT DOCUMENTS 2541715 4/1976 Fed. Rep. of Germany ...... 417/243

Primary Examiner—Leonard E. Smith
Assistant Examiner—Eugene L. Szczecina, Jr.
Attorney, Agent, or Firm—McGlew and Tuttle

[57] ABSTRACT

The invention includes a compressor unit with a connected drive by a high-frequency motor for compressing gases and which is suitable for great ocean depths and for natural gas conveyance from the ocean floor where the low temperature obtaining in the water is effectively utilized. The compressor unit is supported by magnetic bearings in a housing. The compressor includes a plurality of compressor stages connected by pipe lines which form a surface cooler on the suction side arranged around the housing.

15 Claims, 3 Drawing Sheets

COMPRESSOR UNIT

BACKGROUND OF THE INVENTION

1. Field of the Invention

The invention relates in general to compressors and in particular to a new and useful compressor unit driven by a high-frequency motor with bearings which are connected to compressor stages and arranged along with them in a common housing sealed gas-tight against the outside, with the common housing being surrounded by a liquid for cooling the high-frequency motor, the bearings and the compressor stages.

Until now, in off-shore drilling for natural gas, compressors on platforms have been used. At great water depths and in the Arctic ocean, for example, the secure fastening of the drilling platform becomes difficult. Also, the potentially favorable effect of the low temperatures obtaining in the water in these locations is not utilized for the compression process.

A compressor is known, preferentially for conveying a gas containing a radioactive substance, with a housing which is connected with the housing of an electromotor which is sealed gas-tight against the outside atmosphere (DE-OS No. 1 811 232). The two electromotors are short-circuit runner motors, whose cage runners are overhung on the ends of the compressor shaft. The compressor bearings additionally absorb the forces generated by the magnetic traction as well as by the runner weight. Packing between the compressor housing and the motor housings is not necessary. The connection between compressor and motor permits gas to enter the motor room, therefore the motor housing, fastening flange, and counter shield are constructed for the occurring excess pressures.

SUMMARY OF THE INVENTION

The present invention provides a compressor unit which can be used for natural gas conveyance at great ocean depths.

In accordance with the invention, a compressor unit includes magnetic bearings in a housing located at a small spacing from the flow channels of the compressor stages. Pipe lines are disposed on the gas side between the groups of compressor stages and form surface coolers arranged around the housing, and the suction side gas pipe line is formed as a surface cooler.

Cooling of the motor, the bearings, and the gas in the compressor takes place in an optimum manner by the liquid (i.e. sea water) surrounding the common housing. For this purpose it is best to provide the housing with cooling ribs.

The position of the shaft can be horizontal, vertical or in any given position in between. The shaft position is advisably kept constant by an automatic levelling device which, for example, is controlled by the liquid and the gas pressure in ballast chambers surrounding the housing.

Saving energy is achieved in that the compression of the gas takes place in the compressor stages under the influence of the cold liquid (sea water) surrounding the housing at a lower polytropic exponent than in adiabatic compression. This is supported, in particular if the housing in the region of compressor stages is so constricted that the external liquid surrounds flow-carrying structural parts, such as return channels and diffusors.

Further energy saving can be achieved in that the connecting pipes are formed between groups of compressor stages as surface coolers through the inside of which gas flows and which on the outside are surrounded by the liquid circumcirculating the housing. These surface coolers can be placed, for example as annular coolers around the housing.

A part of the gas recooled in this way can be utilized for cooling the rotor of the high-frequency motor as well as for cooling the magnetic bearing.

Saving additional energy is also possible if warm drawn-in gas, before entering into the suction sleeve of the first compressors stage, flows through a suction pipe formed as surface cooler.

Optimum flow toward the compressor stage results if the suction absorption takes place axially.

A compact design with few bearings is obtained if the compressor stages respectively groups of stages are arranged on the shaft journal of the high-frequency motor.

To achieve the least possible axial bearing load it is best if the compressor stages and the groups of compressor stages are arranged with their rearward ends facing each other as far as the cooler arrangement permits this.

The high-frequency motor can be doubly or multiply supported, in particular if the exciter is arranged on the same shaft.

With large numbers of stages it can be useful to support the high-frequency motor and the compressor separately and to connect the shafts with each other, possibly via gearing.

To avoid an axial joint of the housing it is advisable to construct the components of the compressor unit axially symmetrical in order to permit axial assembly.

The required shaft packings within the housing of the compressor unit are built in a standard manner as labyrinth packing, or gas packing, according to the gas bearing principle or as contact-free magnetic shaft packings.

In this way, a modular compressor unit results under the invention which can withstand the pressure conditions and which is easily sealed and which is fed solely by electrical supply cables without oil supply.

Accordingly it is an object of the invention to provide a compressor which has a housing which is positionable in a liquid such as sea water and which has a compressor shaft along which are arranged, the plurality of compressor stages, and which is driven by a drive motor, in the housing, connected to the shaft, and including a surface cooler gas pipe, connected to said compressor, between at least two of the stages and extending out of the housing into the liquid surrounding the housing.

A further object of the invention is to provide a compressor particularly for off shore drilling operations in which the functioning of the compressor is improved by cooling the compressor with the sea water.

A further object of the invention is to provide a compressor which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

GENERAL DESCRIPTION OF THE PREFERRED EMBODIMENTS

Figure 1:
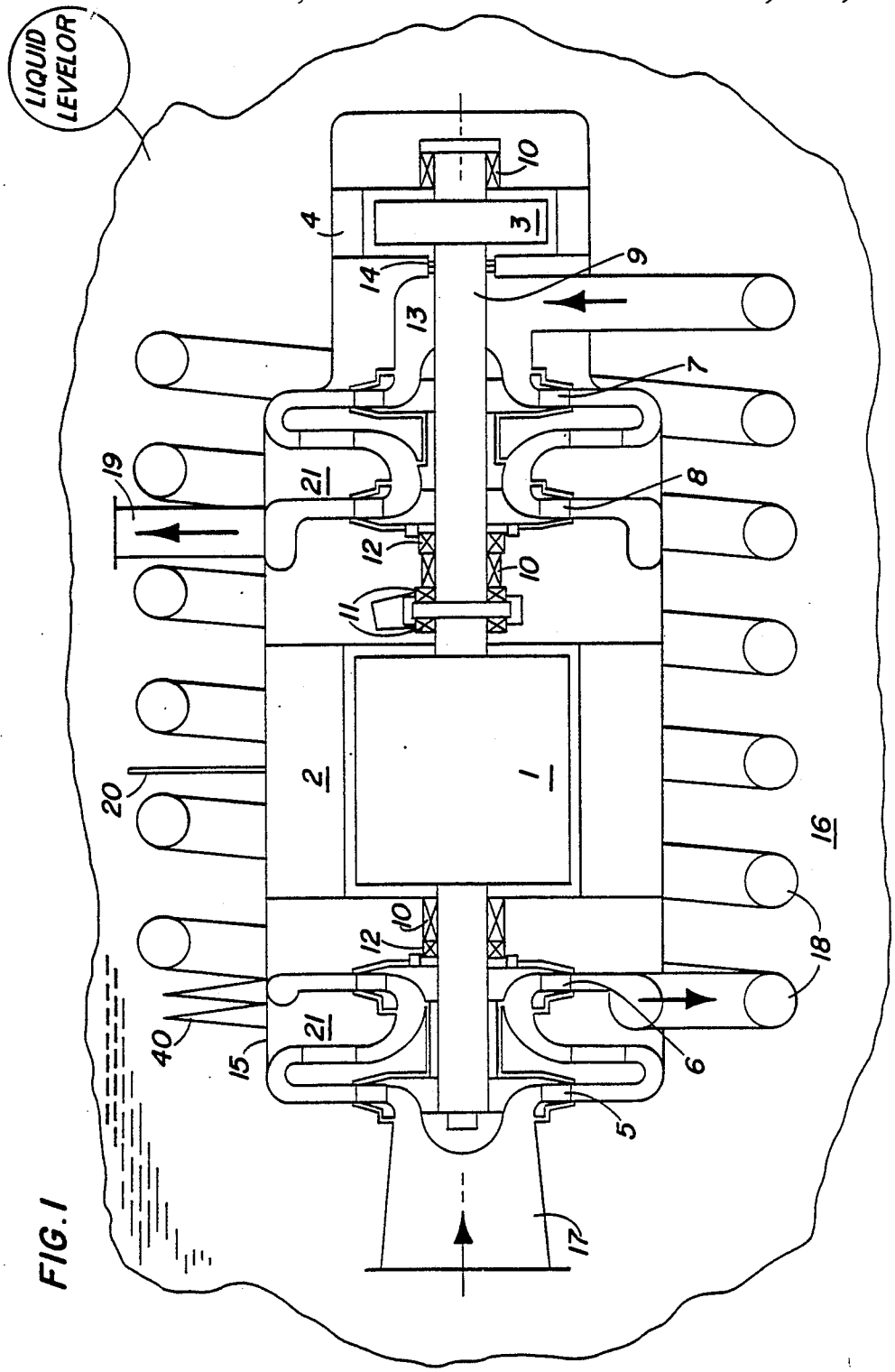
FIG. 1 is a longitudinal sectional view of a compressor unit with compressor stages arranged on the shaft ends of the high-frequency motor in accordance with the invention.

Referring to the drawings in particular the invention embodied therein comprises a compressor unit which includes a compressor shaft 9 having a plurality of compressor stages 5 and 6, 7 and 8 arranged along the shaft. The shaft is driven by a drive motor 1 which is connected to the shaft within the housing 15 for the compressor. In accordance with the invention a surface cooler gas pipe 18 is connected to a plurality of the compressor states and it extends outside of the housing 15 for the compressor into the cooling liquid such as the sieve 16 into which the housing 15 is positioned.

FIG. 1 shows a high-frequency motor comprising a rotor 1 and a stator 2 as well as an exciter with a rotor 3 and a stator 4 which are arranged along with radial compressor stages 5, 6, 7, 8 on a common shaft 9.

Shaft 9 is supported in three radial magnetic bearings 10 and the axial magnetic bearings 11. A compressor driven by the motor includes radial compressor stages 5 and 6 and 7 and 8 respectively, which are sealed against the radial magnetic bearings 10 on the high-frequency motor with a blocking gas packings 12 according to the gas bearing principle. Between a suction sleeve 13 of a third radial compressor stage 7 and the exciter motor 3 and stator 4 the shaft packing 14 is formed as labyrinth packing. High-frequency motor 1, exciter 2 and the radial compressor stages 5, 6, 7 and 8 are located in a common housing 15 which is gas-tight toward the outside against the surrounding liquid 16.

The gas to be moved enters the compressor through the suction sleeve 17 of the first radial compressor stage 5. From the runner of the first stage the gas flows through a return channel into the runner of the second stage 6 and from there through the diffusor onto a surface cooler 18 formed as an annular cooler 18 which surrounds the housing 15 concentrically as a pipe coil.

In the annular cooler or surface cooler 18 the gas is directly cooled by the surrounding liquid 16. The cooled gas enters through a suction sleeve 13 a third and succeeding radial compressor stages 7 and 8.

From the diffusor of the last compressor stage 8, the gas enters the pressure pipe 19 from which it is carried to the (not shown) consumer.

The current supply of the high-frequency motor and the control of the compressor unit takes place via cables 20.

The chambers 21 between the radial compressor stages 5, 6 and 7, 8 can possibly be used for cooling with the surrounding liquid.

The construction of the compressor unit, in particular with respect to mounting of the components of the housing which is undivided in the axial direction, is not shown.

Figure 1A:
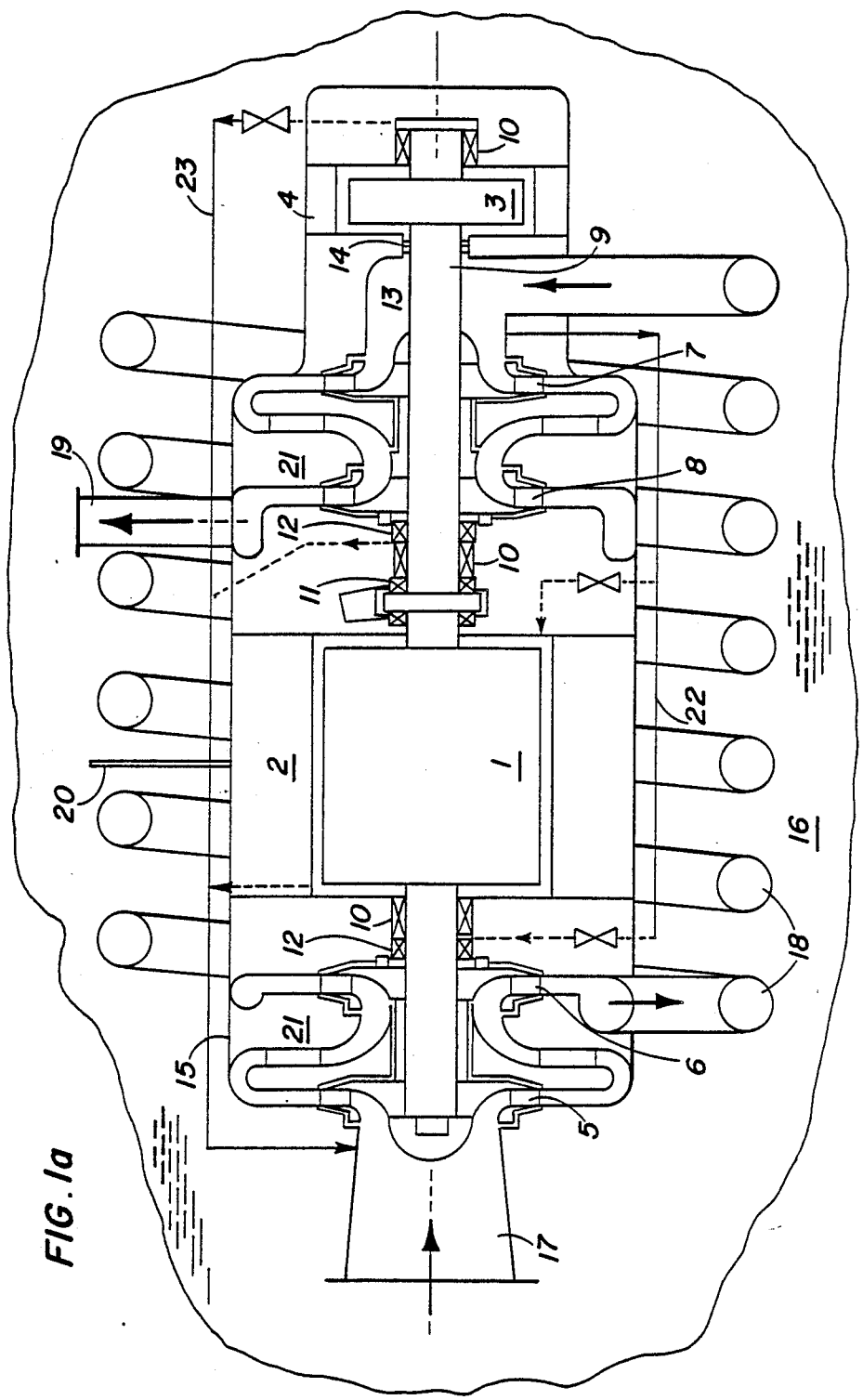
FIG. 1a is a longitudinal section similar to FIG. 1, but with supply pipes.

According to FIG. 1a a portion of the gas stream is removed after the annular cooler or (surface cooler 18) via supply channels 22 for cooling the rotor 1 of the high-frequency motor, the rotor 3 of the exciter as well as of the magnetic bearings 10 and 11 are carried to the suction sleeve 17 via draw-off channels 23.

Figure 2:
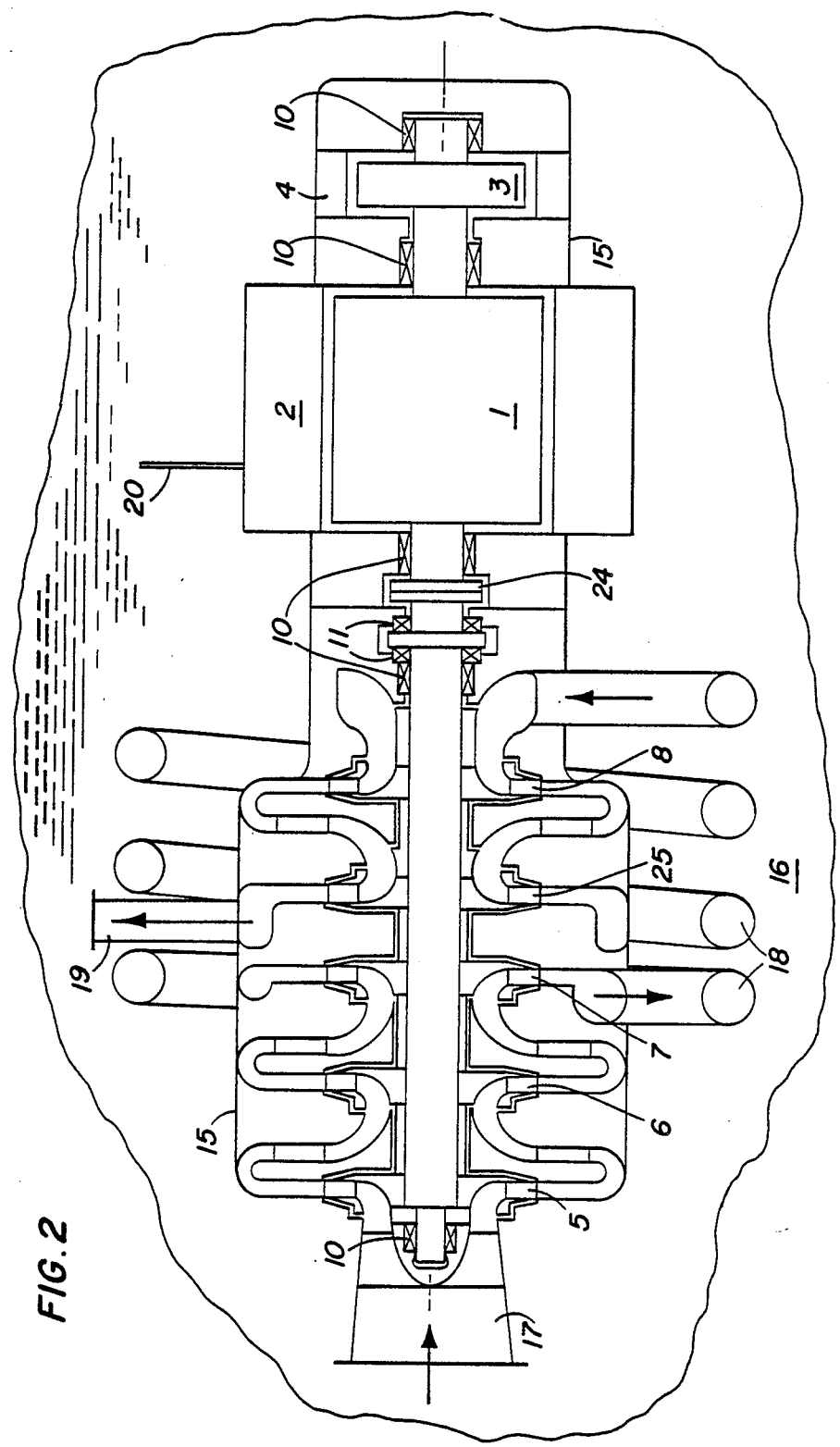
FIG. 2 is a longitudinal sectional view of a compressor unit with large number of compressor stages and in which the compressor stages are supported separately and according to another embodiment of the invention.

FIG. 2 shows a construction with the high-frequency motor 1 and stator 2 and with the exciter 3, and 4 supported separately in three axially spaced radial magnetic bearings 10 at one end of the compressor.

The high-frequency motor 1, 2 drives a five-stage radial compressor via a coupling 24. The compressors includes stages 5, 6, and 7 in a low pressure part and a high pressure part includes stages 8 and 25. The radial compressor is supported in two radial magnetic bearings 10 and an axial magnetic bearing 11.

The entire compressor unit with drive is disposed in a common gas-tight housing 15. The surface cooler 18 is again, as in the embodiment according to FIG. 1, outside the housing 15 in the surrounding liquid 16. The housing 15 forms an interior chamber 21. Cooling ribs 40 are advantageously provided to aid in cooling the compressor and are shown only on FIG. 1.

What is claimed is:

1. A compressor comprising a housing having surfaces in contact with sea water, an electric drive motor in said housing, a shaft connected to said electric drive motor and extending on at least one side of said drive motor through said drive motor housing, a compressor arranged in said housing with said drive motor and having means defining at least one compressor stage on at least one side of said drive motor, an axial suction inlet for said compressor on one end of said housing and a radially pressure discharge connected to said stages, magnetic bearings supporting said shaft adjacent to said drive motor on each end thereof and a cooling coil connected to said compressor at said at least one stage and encircling said housing; said coil having surfaces for heat transfer with the sea water.

2. A compressor according to claim 1, wherein said shaft includes portions extending from each side of said electric drive motor, each portion of said shaft being connected to stages of said compressor.

3. A compressor arrangement, comprising: a housing having an outer surface in contact with sea water; a high frequency motor positioned in said housing; a compressor shaft connected to said high frequency motor and extending through said high frequency motor and extending from said high frequency motor on at least one side; a compressor arranged in said housing with said drive motor and including a plurality of compressor stages connected to said shaft, said compressor stages having flow channels positioned adjacent said housing for heat transfer with said sea water; a plurality of magnetic oil free bearings supporting said shaft; and, surface cooler means including a cooling pipeline connected between stages of said plurality of stages, said cooling pipeline extending around and spaced away from said housing and having an outer surface in contact with the sea water for transfer of heat from gas passing between compressor stages of said plurality of compressor stages and the sea water.

4. A compressor arrangement according to claim 1 wherein said housing has external cooling ribs.

5. A compressor arrangement according to claim 1, wherein said pipeline connecting said compressor stages is formed as an annular cooler pipe extending around the exterior of said housing said cooler pipe carrying gases from each of the stages to the next adjacent stage, said cooler comprising an annular pipe extending around said housing in the form of a coil.

6. A compressor arrangement according to claim 1, wherein said compressor stages include discharge portions which are arranged in opposed facing relationship in respect to each other.

7. A compressor arrangement according to claim 1, wherein said high frequency motor includes an exciter provided with at least two magnetic bearings.

8. A compressor arrangement according to claim 1, wherein said compressor unit does not have an axial joint said drive shaft is axially symmetrical.

9. A compressor arrangement according to claim 3, including leveling means for stabilizing the housing in the sea water.

10. A compressor arrangement according to claim 1, wherein said housing includes radial recesses, the sea water being in contact with surfaces of the recesses, said flow channels being positioned adjacent said recesses for heat transfer to sea water in said recesses.

11. A compressor arrangement according to claim 1, further comprising: channels connected to said surface cooler means and connected to a rotor of the high frequency motor, an exciter of the high frequency motor and said magnetic bearings to cool said high frequency motor and said magnetic bearings.

12. A compressor arrangement according to claim 1, wherein said plurality of compressor stages include at least a first compressor stage having an axial suction absorption.

13. A compressor arrangement according to claim 1, wherein said compressor shaft includes a first shaft portion connected to a first side of said high frequency motor and a second shaft portion connected to a second side of said high frequency motor, a first group of said plurality of compressor stages being connected to said first shaft portion and a second group of said plurality of compressor stages being connected to said second shaft portion.

14. A compressor arrangement according to claim 1, wherein said high frequency motor includes an exciter with a shaft supported by magnetic bearings separately from the magnetic bearings supporting said compressor shaft.

15. A compressor arrangement according to claim 1, further comprising shaft packings formed as a labyrinth packing.

* * * * *